(12) United States Patent
Jun

(10) Patent No.: US 8,533,444 B2
(45) Date of Patent: Sep. 10, 2013

(54) BOOTING SYSTEM, IMAGE FORMING APPARATUS HAVING THE SYSTEM AND CONTROL METHOD THEREOF

(75) Inventor: Jin Hwi Jun, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 906 days.

(21) Appl. No.: 12/128,659

(22) Filed: May 29, 2008

(65) Prior Publication Data

US 2009/0089572 A1 Apr. 2, 2009

(30) Foreign Application Priority Data

Oct. 2, 2007 (KR) .................. 10-2007-0099271

(51) Int. Cl.
*G06F 9/00* (2006.01)
*G06F 9/24* (2006.01)
*G06F 15/177* (2006.01)

(52) U.S. Cl.
USPC .................................................. 713/2; 713/1

(58) Field of Classification Search
USPC ........................................ 713/1, 2; 711/202
See application file for complete search history.

(56) References Cited

U.S. PATENT DOCUMENTS

| | | | |
|---|---|---|---|
| 5,535,357 A | 7/1996 | Moran et al. | |
| 2003/0028708 A1* | 2/2003 | Moran | 711/103 |
| 2004/0250057 A1* | 12/2004 | Fujita et al. | 713/1 |
| 2005/0108500 A1* | 5/2005 | Kishida et al. | 711/218 |
| 2007/0233955 A1* | 10/2007 | Luo et al. | 711/115 |
| 2007/0239977 A1* | 10/2007 | Wu | 713/2 |

FOREIGN PATENT DOCUMENTS

| | | |
|---|---|---|
| KR | 2003-74106 | 9/2003 |
| KR | 1020060031187 | 4/2006 |
| KR | 1020070006517 | 1/2007 |

OTHER PUBLICATIONS

Korean Office Action Issued on Apr. 25, 2012 in KR Patent Application No. 10-2007-0099271.

* cited by examiner

*Primary Examiner* — Kim Huynh
*Assistant Examiner* — Brandon Kinsey
(74) *Attorney, Agent, or Firm* — Stanzione & Kim, LLP

(57) ABSTRACT

A booting system including a boot code transmission control unit to sequentially execute a booting operation concurrently with storing boot codes stored in a NAND flash memory in an internal memory. The boot code transmission control unit includes storage units to store addresses of the boot codes stored in the internal memory and an address of a boot code to be accessed by a CPU core for the execution of the booting operation, respectively. These addresses are checked by monitoring a memory interface and a bus interface. When the boot code addresses are the same, the boot code transmission control unit transmits a boot code corresponding to the same address, among the boot codes stored in the internal memory, to the CPU core so that the CPU core can sequentially execute the booting operation.

24 Claims, 5 Drawing Sheets

BOOTING SYSTEM, IMAGE FORMING APPARATUS HAVING THE SYSTEM AND CONTROL METHOD THEREOF

CROSS-REFERENCE TO RELATED APPLICATIONS

This application claims priority under 35 U.S.C. §119(a) from Korean Patent Application No. 2007-0099271, filed on Oct. 2, 2007 in the Korean Intellectual Property Office, the disclosure of which is incorporated herein in its entirety by reference.

BACKGROUND OF THE INVENTION

1. Field of the Invention

The present general inventive concept relates to a booting system to sequentially perform a booting operation concurrently with storing boot codes, an image forming apparatus having the booting system, and a control method thereof.

2. Description of the Related Art

A typical personal digital assistant (PDA), mobile phone, set top box, or image forming apparatus, such as a copy machine or printer, employs an automatic booting system that automatically performs a booting operation upon application of power.

In this automatic booting system, a number of initialization functions are carried out by executing a program installed in a basic input/output system (BIOS). Such functions generally include a function to check a complementary metal oxide semiconductor (CMOS) setup for custom setting, a function to load an interrupt handler and device drivers, a function to reset registers and a device manager, a function to perform a power-on self-test (POST) for installed constituent elements, such as disc drives, or peripheral devices, a function to display system settings, a function to determine which constituent elements are drivable, and a function to start a bootstrap sequence.

In generally, the BIOS (or booting) program is stored in a read only memory (ROM), electrically erasable programmable read only memory (EEPROM) or NOR flash memory.

Recently, there has been a need for a memory that is cost-effective and supports high-speed access and large capacity due to the growth of system markets and the service diversity, high functionality and high capacity of systems. However, the NOR flash memory has a limitation in meeting such a need.

On the other hand, a NAND flash memory is widely used as a large-capacity memory, because it is easy to implement with a large capacity in terms of a memory structure and can be manufactured at lower cost than the NOR flash memory. Also, since the NAND flash memory can be manufactured more easily than the NOR flash memory and has a better integration than the NOR flash memory, it has been proposed to be used for the purpose of storing the booting program.

One example of an automatic booting system having a NAND flash memory to store a booting program is described in U.S. Pat. No. 5,535,357.

Referring to FIG. 1, a conventional automatic booting system 1 has a central processing unit (CPU) core 11 to interface with a NAND flash memory 30 and a system memory 40 via a system bus 10.

A NAND flash memory controller 20 acts to temporarily store data therein and transfer the stored data between the CPU core 11 and the NAND flash memory 30. To this end, the NAND flash memory controller 20 includes a bus interface 21 to interface with the CPU core 11 and system memory 40 via the system bus 10, and a memory interface 23 to interface with the NAND flash memory 30. Here, a NOR interface logic can be applied to the bus interface 21, and a NAND interface logic can be applied to the memory interface 23.

The NAND flash memory controller 20 further includes a control logic 24, and a register 25.

After a loading operation to store all boot codes of the NAND flash memory 30 in an internal memory 22 is completed, the CPU core 11 executes a booting operation using the boot codes. After the booting operation is completed, the CPU core 11 performs a configuration of the system memory 40 (DRAM configuration) and then stores an operating system (OS) program and user data stored in the NAND flash memory 30 in the system memory 40.

Thereafter, the CPU core 11 jumps to the OS program stored in the system memory 40 to control the operation of an associated system.

However, in the conventional booting system, because the CPU core can access the boot codes just after all the boot codes of the NAND flash memory are stored in the internal memory, the actual booting by the CPU core is delayed, resulting in a degradation in system performance.

Further, the transmission of the boot codes from the flash memory to the internal memory is processed at a low speed and the processing speed of the system is then changed to a high speed through one process for execution of the booting operation. As a result, a large amount of time is required for the transmission of the boot codes to the internal memory, thereby increasing the total booting time.

In addition, in order to store all the boot codes, the internal memory must have a large capacity, resulting in increases in size and cost thereof.

SUMMARY OF THE INVENTION

The present general inventive concept decreases a total booting time by sequentially executing a booting operation using boot codes previously stored in an internal memory even before all boot codes are stored in the internal memory.

Additional aspects and/or utilities of the present general inventive concept will be set forth in part in the description which follows and, in part, will be obvious from the description, or may be learned by practice of the general inventive concept.

The present general inventive concept reduces the size and cost of an internal memory that stores boot codes.

The foregoing and/or other aspects and utilities of the general inventive concept may be achieved by providing a booting system, the system including an external memory to store boot codes for execution of a booting operation, a central processing unit (CPU) core to receive the boot codes and execute the booting operation with the boot codes, an internal memory to receive and store the boot codes from the external memory, and a boot code transmission control unit to control an operation to transmit the boot codes stored in the internal memory to the CPU core so that the CPU core can begin to sequentially execute the booting operation before all the boot codes of the external memory are stored in the internal memory.

The boot code transmission control unit may further include a first storage unit to store information about a boot code requested by the CPU core, a second storage unit to store information about the boot codes stored in the internal memory, and a determiner to compare the boot code information in the first and second storage units with each other to determine transmission times of the boot codes stored in the internal memory.

The boot code transmission control unit may be configured to transmit a boot code corresponding to the same boot code information among the boot codes stored in the internal memory to the CPU core when the boot code information in the first storage unit and any one of the boot code information in the second storage unit are the same.

The booting system may further include a memory controller to interface between the CPU core and the external memory, wherein the memory controller includes the internal memory and the boot code transmission control unit.

The memory controller may further include a memory interface to interface between the internal memory and the external memory for transmission of the boot codes, and a bus interface to interface between the CPU core and the internal memory for transmission of the boot codes, wherein the boot code transmission control unit monitors the memory interface and the bus interface to check the boot code information.

The external memory may be a NAND flash memory.

The NAND flash memory may store an operating system program, user data, boot codes, or any combination thereof.

The NAND flash memory may divide the boot codes into a plurality of groups based on addresses assigned respectively to the boot codes.

The internal memory may be a random access memory (RAM).

The internal memory may have a capacity smaller than a capacity capable of storing all the boot codes for the execution of the booting operation.

The CPU core may be configured to request access to a boot code corresponding to the execution process, and process the execution process using the corresponding boot code transmitted in response to the access request.

The CPU core may be further configured to process at least one of a reset process, phase locked loop (PLL) setting, clock division ratio setting, system memory configuration, and an input/output (I/O) control.

The foregoing and/or other aspects and utilities of the general inventive concept may also be achieved by providing an image forming apparatus having a booting system to execute a booting operation using boot codes of a NAND flash memory, the booting system including a NAND flash memory controller to control an operation to store the boot codes of the NAND flash memory in an internal memory and, concurrently, an operation to transmit the boot codes stored in the internal memory to a CPU core, and the CPU core to request the NAND flash memory controller to transmit boot codes required for the execution of the booting operation, receive the requested boot codes through the NAND flash memory controller and sequentially execute the booting operation using the received boot codes.

The NAND flash memory controller may include a boot code transmission control unit to control an operation to transmit the boot codes stored in the internal memory to the CPU core in response to the request from the CPU core before all the boot codes of the NAND flash memory are stored in the internal memory.

The boot code transmission control unit may include a first storage unit to store an address of a boot code requested by the CPU core, a second storage unit to store addresses of the boot codes stored in the internal memory, and a determiner to compare the boot code address in the first storage unit with each of the boot code addresses in the second storage unit and, when the boot code address in the first storage unit and any one of the boot code addresses in the second storage unit are the same, determine a current time to be a transmission start time of a boot code corresponding to the same boot code address, among the boot codes stored in the internal memory.

The foregoing and/or other aspects and utilities of the general inventive concept may also be achieved by providing a control method of a booting system to execute a booting operation using a NAND flash memory controller, the memory controller transmitting boot codes of a NAND flash memory to a CPU core, the method including storing the boot codes of the NAND flash memory in an internal memory of the NAND flash memory controller, determining whether an address of a boot code requested by the CPU core is the same as any one of addresses of the boot codes stored in the internal memory while the boot codes of the NAND flash memory are stored in the internal memory, if it is determined that the address of the boot code requested by the CPU core is the same as any one of the addresses of the boot codes stored in the internal memory, transmitting a boot code corresponding to the same boot code address, among the boot codes stored in the internal memory, to the CPU core before all the boot codes of the NAND flash memory are stored in the internal memory, and the CPU core executing the booting operation using the transmitted boot code.

The CPU core may determine whether the booting operation has been completed, and, if it is determined that the booting operation has not been completed, may request an access to boot codes remaining, not transmitted, in the internal memory to process the remaining processes of the booting operation, receive the remaining boot codes, and complete the booting operation using the received boot codes.

An operating system program and user data stored in the NAND flash memory may be transmitted to the CPU core after the booting operation is completed.

The foregoing and/or other aspects and utilities of the general inventive concept may also be achieved by providing a control method of a booting system, the method including checking an operation to stepwise transmit boot codes of an external memory to an internal memory, checking whether a partial booting operation is performed using at least one of the boot codes stored in the internal memory, and verifying a booting operation according to whether the partial booting operation is performed at least once before all of the boot codes of the external memory are transmitted to the internal memory.

The boot code transmission operation and the partial booting operation may be performed concurrently.

The partial booting operation may including at least one of reading serial presence detect (SPD) information from a system memory, initializing the system memory using the read SPD information, displaying a predetermined message on an operating panel of an associated apparatus, driving a motor to rotate a blower fan, changing a clock frequency to be externally outputted, and checking instructions of a CPU operation using a CPU debugger.

The foregoing and/or other aspects and utilities of the general inventive concept may also be achieved by providing a booting system, the system including an internal memory to receive and store boot codes for execution of a booting operation, and a boot code transmission control unit to control an operation to transmit the boot codes stored in the internal memory to a central processing unit (CPU) core so that the CPU core can begin to sequentially execute the booting operation before all the boot codes for the booting operation are stored in the internal memory.

The foregoing and/or other aspects and utilities of the general inventive concept may also be achieved by providing a control method of booting a system, the method including receiving and storing boot codes for execution of a booting operation in an internal memory, and controlling the transmission of the boot codes stored in the internal memory to a central processing unit (CPU) core so that the CPU core can begin to sequentially execute the booting operation before all the boot codes for the booting operation are stored in the internal memory.

The foregoing and/or other aspects and utilities of the general inventive concept may also be achieved by providing a computer-readable medium having recorded thereon a program to implement a control method of booting a system, the method including receiving and storing boot codes for execution of a booting operation in an internal memory, and controlling the transmission of the boot codes stored in the internal memory to a central processing unit (CPU) core so that the CPU core can begin to sequentially execute the booting operation before all the boot codes for the booting operation are stored in the internal memory.

The foregoing and/or other aspects and utilities of the general inventive concept may also be achieved by providing an image forming apparatus having a booting system to execute a booting operation using boot codes, the booting system including a memory controller to control an operation to store the boot codes in an internal memory and, concurrently, an operation to transmit the boot codes stored in the internal memory to a central processing unit (CPU) core, and the CPU core to request the memory controller to transmit boot codes for the execution of the booting operation, to receive the boot codes requested through the memory controller and to sequentially execute the booting operation using the received boot codes.

The foregoing and/or other aspects and utilities of the general inventive concept may also be achieved by providing a control method of a booting system to execute a booting operation, the method including storing boot codes received in an internal memory, determining whether an address of a boot code requested by a central processing unit (CPU) core is the same as any one of addresses of the boot codes stored in the internal memory while the boot codes are received and stored in the internal memory, if it is determined that the address of the boot code requested by the CPU core is the same as any one of the addresses of the boot codes stored in the internal memory, transmitting a boot code corresponding to the same boot code address, among the boot codes stored in the internal memory to the CPU core before all the boot codes for the booting operation are received and stored in the internal memory, and the CPU core executing the booting operation using the transmitted boot code.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
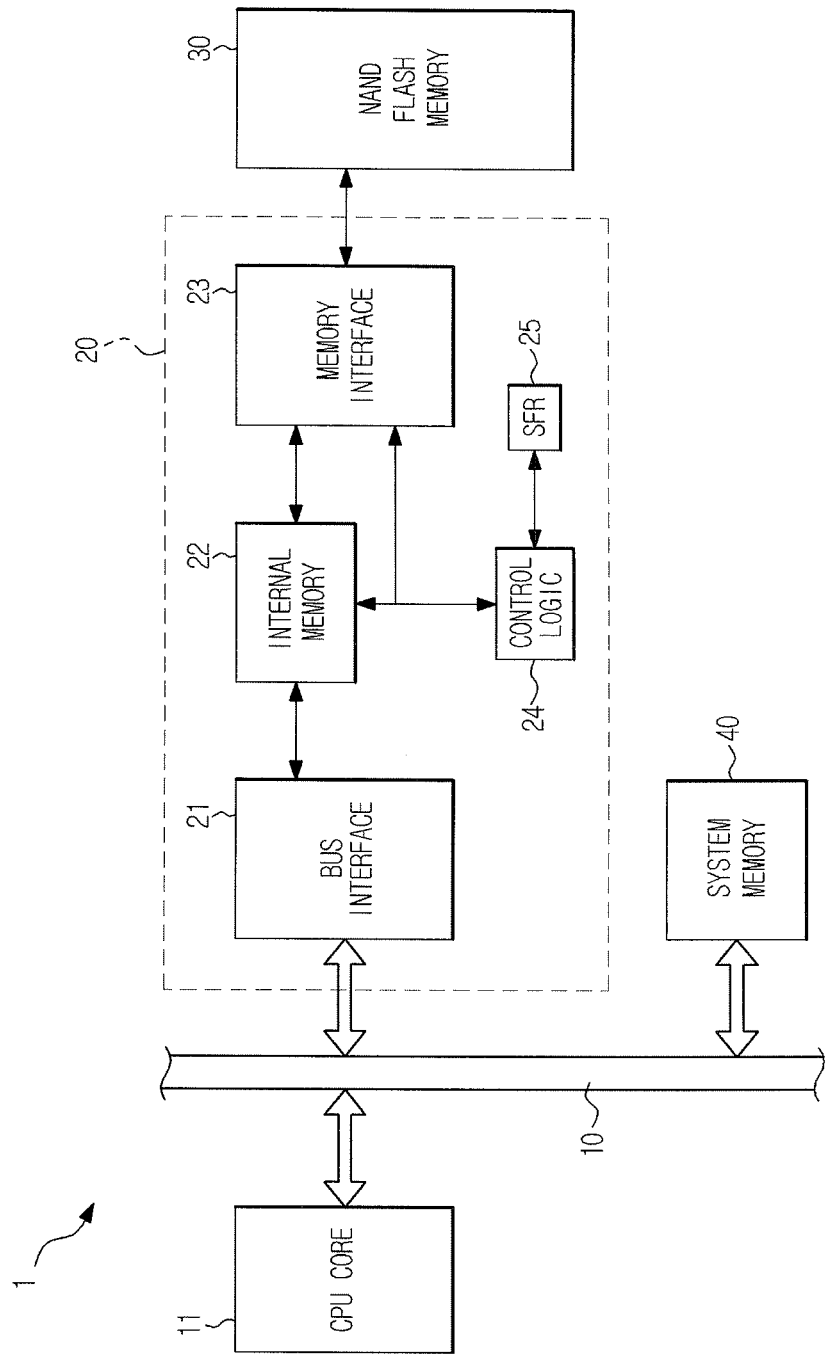
FIG. 1 is a block diagram illustrating the configuration of a conventional booting system.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 2:
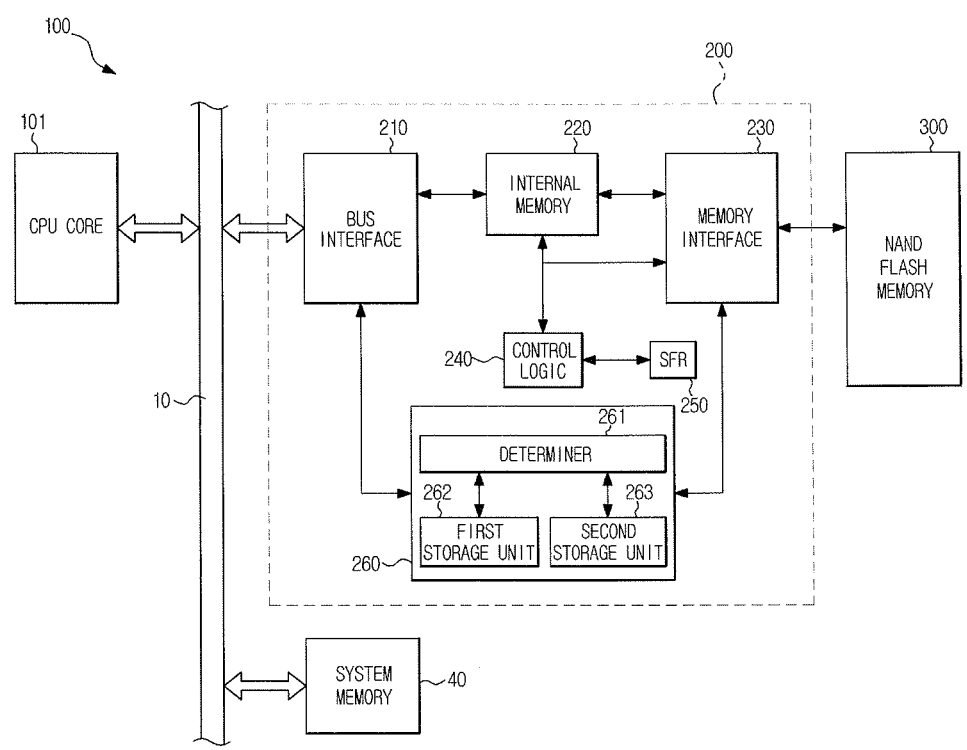
FIG. 2 is a block diagram illustrating the configuration of a booting system according to an embodiment of the present general inventive concept.

FIG. 2 is a block diagram illustrating the configuration of a booting system according to an embodiment of the present general inventive concept.

The system, denoted by reference numeral 100, includes a CPU core 101, a NAND flash memory 300 and a system memory 40 which interface with one another via a system bus 10. The system memory 40 may be implemented with a dynamic random access memory (DRAM), a static random access memory (SRAM), or any other suitable memory.

A NAND flash memory controller 200 interfaces between the CPU core 101 and the NAND flash memory 300, which is an external memory, to temporarily store data in an internal memory 220 and transfer the stored data between the CPU core 101 and the NAND flash memory 300. The internal memory 220 may be implemented with a RAM, or any other suitable memory.

The NAND flash memory controller 200 includes a bus interface 210 to interface with the CPU core 101 and system memory 40 via the system bus 10, a memory interface 230 to interface with the NAND flash memory 300, a control logic 240, and a register 250. Here, a NOR interface logic may be applied to the bus interface 210, and a NAND interface logic may be applied to the memory interface 230, although any suitable interface logic may be used.

The register 250 stores information about a configuration and commands of the system. The control logic 240 acts to manage and control the NAND flash memory controller 200.

Upon application of power to the system 100, the control logic 240 stores boot codes of the NAND flash memory 300 in the internal memory 220 via the memory interface 230.

In the present embodiment, the NAND flash memory controller 200 may further include a boot code transmission control unit 260.

The boot code transmission control unit 260 includes a determiner 261 to determine transmission times of the boot codes stored in the internal memory 220, a first storage unit 262 to store information about a boot code to which access is requested by the CPU core 101, and a second storage unit 263 to store information about the boot codes which are stored in the internal memory 220 via the memory interface 230.

Figure 3:
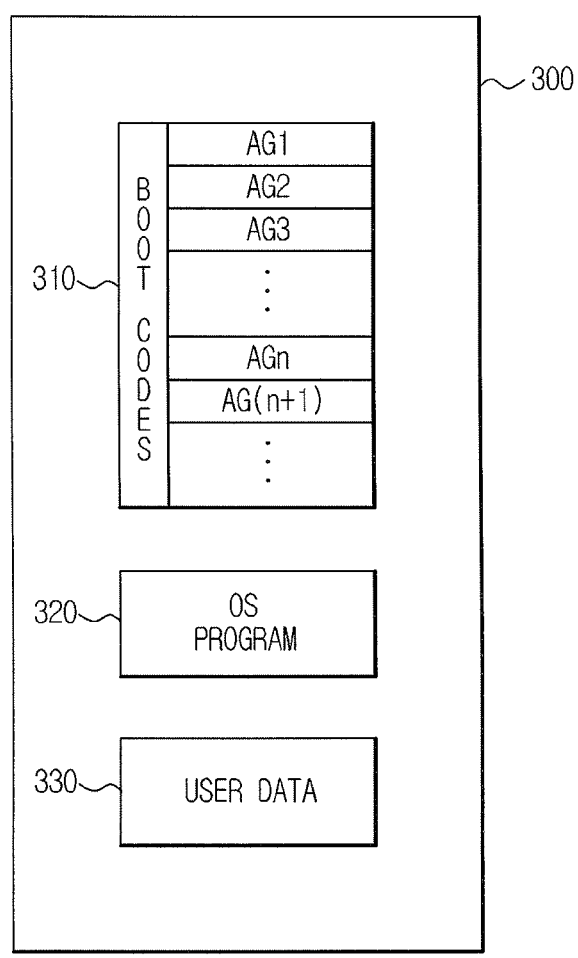
FIG. 3 is a view illustrating a data structure of a NAND flash memory according to an embodiment of the present general inventive concept.

As illustrated in FIG. 3, data stored in the NAND flash memory 300 includes boot codes 310, an OS program 320 (e.g., an operating system), and user data 330.

The boot codes 310 include a plurality of codes for processing of a number of execution processes including system initialization. These execution processes may be, for example, a reset process, phase locked loop (PLL) setting, clock division ratio setting, system memory configuration (DRAM configuration), or input/output (I/O) control, or any other suitable execution process, or any combination thereof. Addresses are assigned to the plurality of codes, respectively, so that the respective codes can be recognized based on the corresponding addresses.

The boot codes 310 are divided into a plurality of address groups AG1, AG2, . . . , AGn, . . . based on their addresses. The order of the address groups is set in consideration of a booting process, but does not necessarily coincide with the order of booting.

Generally, in a booting operation, a number of execution processes are sequentially performed according to processing processes. Provided that some of the boot codes can satisfy given processing processes, the booting operation can be executed. Other processing processes may thereafter be executed. In this manner, the booting operation can be sequentially advanced.

That is, if one or more of the boot codes are stored in the internal memory and the one or more stored boot codes meet conditions capable of processing at least one execution process of the booting operation, the CPU core 110 can start the booting operation before all the boot codes are stored in the internal memory. In other words, all the boot codes are not needed from the beginning of the booting operation. Also, because the one or more boot codes generally have locality thereamong, one or more boot codes for a booting sequence to be earlier processed, among them, are stored in the internal memory earlier. Therefore, the booting operation can be sequentially executed using one or more boot codes, earlier stored.

The booting by the CPU core 101 is started earlier than in typical related art systems, and the booting may be performed concurrently with storing the boot codes in the internal memory 220. Thus, the total booting time may be decreased.

The boot code transmission control unit 260 controls an operation to store boot code information respectively in the first storage unit 262 and second storage unit 263 by monitoring the operations of the bus interface 210 and memory interface 230, and an operation to transmit a boot code of the internal memory 220 to the CPU core 101 by comparing the boot code information stored in the respective storage units with each other.

While the boot codes of the NAND flash memory 300 are sequentially stored in the internal memory 220, the second storage unit 263 stores addresses of the boot codes stored in the internal memory 220. Also, the first storage unit 262 stores an address of a boot code which is requested by the CPU core 101 for execution of the booting operation.

The determiner 261 determines whether the boot code address stored in the first storage unit 262 is the same as any one of the boot code addresses stored in the second storage unit 263 and, upon determining that the boot code address in the first storage unit 262 is the same as any one of the boot code addresses in the second storage unit 263, transmits a boot code corresponding to the same boot code address, among the boot codes stored in the internal memory 220, to the CPU core 101 via the bus interface 210.

Upon receiving the requested boot code from the bus interface 210, the CPU core 101 processes any one execution process as a part of the booting operation using the received boot code. The CPU core 101 sends a boot code address for access to a boot code corresponding to the subsequent execution process to the bus interface 210 in order to process the subsequent execution process. The bus interface 210 transfers the address of the boot code to which access is requested by the CPU core 101 to the boot code transmission control unit 260, which then stores the transferred boot code address in the first storage unit 261.

As stated above, while the CPU core 101 executes a part of the booting operation, one or more other boot codes, not transmitted yet from the NAND flash memory 300, are sequentially delivered and stored to the internal memory 220 via the memory interface 230.

Figure 4:
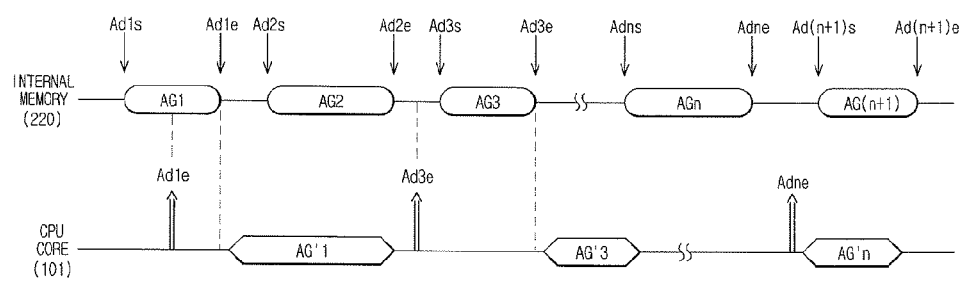
FIG. 4 is a view illustrating a booting operation which is sequentially executed according to an embodiment of the present general inventive concept.

As illustrated in FIG. 4, when transmission of a boot code of a first end address Ad1e of the first address group AG1 is requested by the CPU core 101 while boot codes of the first address group AG1 are stored in the internal memory 220 beginning with a boot code of a first start address Ad1s of the first address group AG1, the CPU core 101 temporarily enters a hold state because the boot code of the first end address Ad1e is not stored yet in the internal memory 220. The boot codes of the first address group AG1 may be continuously stored in the internal memory 220.

When the boot code of the first end address Ad1e of the first address group AG1 is stored in the internal memory 220, the address (first end address Ad1e) of the boot code requested by the CPU core 101 and the address (first end address Ad1e) of the boot code stored in the internal memory 220 (stored respectively in the first storage unit 262 and second storage unit 263) become the same. The determiner 261 transfers the boot codes of the first address group AG1 stored in the internal memory 220 to the CPU core 101 via the bus interface 210.

The CPU core 101 processes a first execution process AG'1, which may be one execution process of the booting operation, using the boot codes of the first address group AG1.

While the first execution process AG'1 is processed, boot codes of the second address group AG2 may be stored in the internal memory 220.

As illustrated in FIG. 4, after the first execution process AG'1, the CPU core 101 requests a boot code of a third end address Ad3e for processing of a second execution process AG'3. When all boot codes of a third start address to the third end address of the third address group AG3 are stored in the internal memory 220, the boot codes of the third address group AG3 are transferred to the CPU core 101 via the bus interface 210. Using at least the boot codes of the third address group AG3, the CPU core 101 processes the second execution process AG'3, which may occur subsequently to processing the first execution process AG'1. Thus, the CPU core 101 requests and receives boot codes, and completes the booting operation through sequential booting to process a plurality of execution processes using the received boot codes.

The CPU core 101 performs a configuration of the system memory 40 (DRAM configuration) and then stores the OS program 320 and user data 330 stored in the NAND flash memory 300 in the system memory 40 via the NAND flash memory controller 200. This may be performed, for example, after completing the booting operation. Thereafter, the CPU core 101 jumps to the OS program stored in the system memory 40 to control the operation of an associated system.

Conventional booting systems typically start the booting operation after storing all the boot codes of the NAND flash memory (e.g., NAND flash memory 30 illustrated in FIG. 1), which is an external memory, in the internal memory. The booting system of the present general inventive concept stepwise stores the boot codes of the NAND flash memory 300 in the internal memory 220 and, concurrently, sequentially executes partial booting operations with some of the boot codes through the CPU core 101, so as to shorten the total booting time.

To verify the booting operation according to the present general inventive concept, it may be tested whether the operation to read some of the boot codes of the NAND flash memory 300 and store the read boot codes in the internal memory 220 and the operation to execute a partial booting operation under the control of the CPU core 101 using the boot codes stored in the internal memory 220 are performed concurrently.

An exemplary test process using test equipment such as an oscilloscope or logic analyzer may check whether the transmission of the boot codes from the external memory 300 is made and whether the partial booting operation is performed is checked concurrently. Here, the partial booting operation may include, for example, reading serial presence detect (SPD) information from the system memory 40, initializing the system memory 40 using the read SPD information, displaying a predetermined message on an operating panel of an associated apparatus, driving a motor to rotate a blower fan, or changing a clock frequency to be externally outputted, or any other booting or partial booting operation. Also, because the partial booting operation is executed under the control of the CPU core, it may include checking instructions of a CPU operation using a CPU debugger provided from the maker of the CPU core.

If the exemplary test determines that the partial booting operation is performed using some boot codes, previously stored, while the boot codes of the NAND flash memory are read, the system can be recognized to be in a normal state. The booting operation according to the present general inventive concept is applied for the normal state. Otherwise, the system can be recognized to be in an erroneous state, and the booting operation according to the present general inventive concept is not applied.

Figure 5:
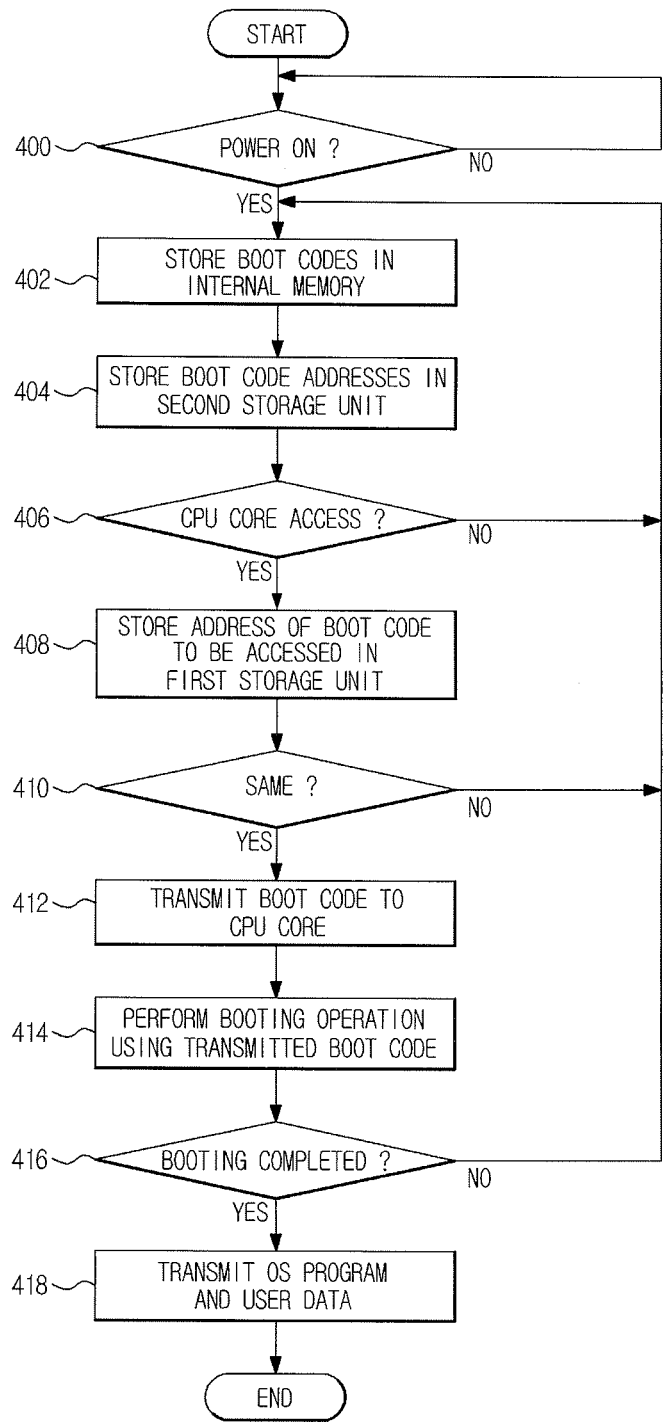
FIG. 5 is a flowchart illustrating a booting system control method according to an embodiment of the present general inventive concept.

Hereinafter, a booting system control method according to an embodiment of the present general inventive concept will be described with reference to FIG. 5.

It is determined whether power is applied to the system in operation 400. If it is determined that power is applied to the system, the control logic 240 stores boot codes of the NAND flash memory 300 in the internal memory 220 via the memory interface 230 in operation 402. At this time, the boot code transmission control unit 260 monitors the memory interface 230 to check addresses of the boot codes stored in the internal memory 220, and stores the boot code addresses in the second storage unit 263 in operation 404.

The boot code transmission control unit 260 monitors the bus interface 210 to determine whether there is an access request from the CPU core 101 to boot in operation 406. Upon determining that there is no access request from the CPU core 101, operation 402 is performed to store the boot codes of the NAND flash memory 300 in the internal memory 220. However, if it is determined that there is an access request from the CPU core 101, the boot code transmission control unit 260 stores, in the first storage unit 262, an address of a boot code to be accessed for processing of at least one execution process as a part of the booting operation in operation 408.

The determiner 261 compares the address in the first storage unit 262 and each of the addresses in the second storage unit 263 with each other to determine whether the address in the first storage unit 262 is the same as any one of the addresses in the second storage unit 263 in operation 410. If it is determined that the address in the first storage unit 262 is not the same as any of the addresses in the second storage unit 263, the method returns to operation 402 to continue the operation to store the boot codes of the NAND flash memory 300 in the internal memory 220. However, upon determining that the address in the first storage unit 262 is the same as any one of the addresses in the second storage unit 263, the determiner 261 transmits a boot code corresponding to the same address, among the boot codes stored in the internal memory 220, as the requested boot code to the CPU core 101 via the bus interface 210 in operation 412.

The CPU core 101 performs at least one execution process of the booting operation using the transmitted boot code in operation 414. The CPU core 101 delivers an access request for a boot code for a next execution process to the boot code transmission control unit 260 via the bus interface 210. The requested boot codes, which may be among the boot codes stored in the internal memory 220, are transmitted to the CPU core 101 so that the CPU core 101 can sequentially execute the booting operation.

The CPU core 101 determines whether the booting operation has been completed in operation 416. Operation 416 may be performed while the CPU core 101 sequentially executed the booting operation (i.e., in operation 416). Upon determining that the booting operation has been completed, the CPU core 101 performs a configuration of the system memory 40 (DRAM configuration) and then stores the OS program 320 and user data 330 stored in the NAND flash memory 300 in the system memory 40 via the NAND flash memory controller 200 in operation 418. Thereafter, the CPU core 101 jumps to the OS program stored in the system memory 40 to control the operation of an associated system.

As is apparent from the above description, according to the present general inventive concept, concurrently with storing boot codes, a CPU core can receive some of the boot codes and perform a booting operation using the received boot codes. Therefore, the actual booting by the CPU core is started earlier, thereby making it possible to decrease the total booting time.

Further, one or more stored boot codes are transmitted in response to a request from the CPU core even before all boot codes are stored. Therefore, a decreased memory capacity may be used, resulting in reductions in size and cost of an internal memory.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A booting system comprising:
   an external memory to store boot codes for execution of a booting operation;
   a central processing unit (CPU) core to receive the boot codes and execute the booting operation with the boot codes;

an internal memory to receive and store the boot codes from the external memory; and a boot code transmission control unit to control an operation to transmit the boot codes stored in the internal memory to the CPU core so that the CPU core can begin to sequentially execute the booting operation before all the boot codes of the external memory are stored in the internal memory, the boot code transmission control unit including:

a first storage unit to store information about a boot code requested by the CPU core;

a second storage unit to store information about the boot codes stored in the internal memory; and a determiner to compare the boot code information in the first and second storage units with each other to determine transmission times of the boot codes stored in the internal memory.

2. The booting system of claim 1, wherein the boot code transmission control unit is configured to transmit a boot code corresponding to the same boot code information among the boot codes stored in the internal memory to the CPU core when the boot code information in the first storage unit and any one of the boot code information in the second storage unit are the same.

3. The booting system of claim 1, further comprising:
a memory controller to interface between the CPU core and the external memory,
wherein the memory controller comprises the internal memory and the boot code transmission control unit.

4. The booting system of claim 3, wherein the memory controller further comprises:
a memory interface to interface between the internal memory and the external memory for transmission of the boot codes; and
a bus interface to interface between the CPU core and the internal memory for transmission of the boot codes,
wherein the boot code transmission control unit monitors the memory interface and the bus interface to check the boot code information.

5. The booting system of claim 1, wherein the external memory is a NAND flash memory.

6. The booting system of claim 5, wherein the NAND flash memory stores an operating system program, user data, or boot codes, or any combination thereof.

7. The booting system of claim 5, wherein the NAND flash memory divides the boot codes into a plurality of groups based on addresses assigned respectively to the boot codes.

8. The booting system of claim 1, wherein the internal memory is a random access memory (RAM).

9. The booting system of claim 8, wherein the internal memory has a capacity smaller than a capacity capable of storing all the boot codes for the execution of the booting operation.

10. The booting system of claim 1, wherein the CPU core is configured to request access to a boot code corresponding to the execution process, and process the execution process using the corresponding boot code transmitted in response to the access request.

11. The booting system of claim 10, wherein the CPU core is further configured to process at least one of a reset process, phase locked loop (PLL) setting, clock division ratio setting, system memory configuration, and an input/output (I/O) control.

12. An image forming apparatus having a booting system to execute a booting operation using boot codes of a NAND flash memory, the booting system comprising:

a NAND flash memory controller to control an operation to store the boot codes of the NAND flash memory in an internal memory and, concurrently, an operation to transmit the boot codes stored in the internal memory to a central processing unit (CPU) core; and the CPU core to request the NAND flash memory controller to transmit boot codes for the execution of the booting operation, to receive the requested boot codes through the NAND flash memory controller and to sequentially execute the booting operation using the received boot codes, wherein the NAND flash memory controller has a boot code transmission control unit including:

a first storage unit to store an address of a boot code requested by the CPU core;

a second storage unit to store addresses of the boot codes stored in the internal memory; and a determiner to compare the boot code address in the first storage unit with each of the boot code addresses in the second storage unit and, when the boot code address in the first storage unit and any one of the boot code addresses in the second storage unit are the same, determine a current time to be a transmission start time of a boot code corresponding to the same boot code address, among the boot codes stored in the internal memory.

13. The image forming apparatus of claim 12, wherein the boot code transmission control unit controls an operation to transmit the boot codes stored in the internal memory to the CPU core in response to the request from the CPU core before all the boot codes of the NAND flash memory are stored in the internal memory.

14. A control method of a booting system to execute a booting operation using a NAND flash memory controller having a first storage unit and a second storage unit, the memory controller transmitting boot codes of a NAND flash memory to a central processing unit (CPU) core, the method comprising:

storing the boot codes of the NAND flash memory in an internal memory of the NAND flash memory controller, storing boot code information requested by the CPU core in the first storage unit, and storing the boot code information stored in the internal memory in the second storage unit;

comparing the boot code information in the first and second storage units with each other to determine transmission times of the boot codes stored in the internal memory;

determining whether the boot code information stored in the first storage unit is the same as any one of the boot codes information stored in the second storage unit while the boot codes of the NAND flash memory are stored in the internal memory;

if it is determined that the boot code information stored in the first storage unit is the same as any one of the boot codes information stored in the second storage unit, transmitting a boot code corresponding to the same boot code information among the boot codes stored in the internal memory to the CPU core before all the boot codes of the NAND flash memory are stored in the internal memory; and the CPU core executing the booting operation using the transmitted boot code.

15. The control method of claim 14, wherein the CPU core determines whether the booting operation has been completed, and, if it is determined that the booting operation has not been completed, requests an access to boot codes remaining, not transmitted, in the internal memory to process the remaining processes of the booting operation, receives the remaining boot codes, and completes the booting operation using the received boot codes.

16. The control method of claim 15, wherein an operating system program and user data stored in the NAND flash memory are transmitted to the CPU core after the booting operation is completed.

17. A control method of a booting system, the method comprising:
checking an operation to stepwise transmit boot codes of an external memory to an internal memory;
checking whether a partial booting operation is performed using at least one of the boot codes stored in the internal memory;
verifying a booting operation according to whether the partial booting operation is performed at least once before all of the boot codes of the external memory are transmitted to the internal memory; and
comparing a boot code address in a first storage unit with each of the boot code addresses in a second storage unit and, when the boot code address in the first storage unit and any one of the boot code addresses in the second storage unit are the same, determining a current time to be a transmission start time of a boot code corresponding to the same boot code address, among the boot codes stored in the internal memory.

18. The control method of claim 17, wherein the boot code transmission operation and the partial booting operation are performed concurrently.

19. The control method of claim 17, wherein the partial booting operation comprises at least one of reading serial presence detect (SPD) information from a system memory, initializing the system memory using the read SPD information, displaying a predetermined message on an operating panel of an associated apparatus, driving a motor to rotate a blower fan, changing a clock frequency to be externally outputted, and checking instructions of a CPU operation using a CPU debugger.

20. A booting system comprising:
an internal memory to receive and store boot codes for execution of a booting operation; and
a boot code transmission control unit to control an operation to transmit the boot codes stored in the internal memory to a central processing unit (CPU) core so that the CPU core can begin to sequentially execute the booting operation before all the boot codes for the booting operation are stored in the internal memory, the boot code transmission control unit including:
a first storage unit to store information about a boot code requested by the CPU core;
a second storage unit to store information about the boot codes stored in the internal memory; and
a determiner to compare the boot code information in the first and second storage units with each other to determine transmission times of the boot codes stored in the internal memory.

21. A control method of booting a system, the method comprising:
receiving and storing boot codes for execution of a booting operation in an internal memory;
controlling the transmission of the boot codes stored in the internal memory to a central processing unit (CPU) core so that the CPU core can begin to sequentially execute the booting operation before all the boot codes for the booting operation are stored in the internal memory; and
comparing a boot code address in a first storage unit with each of the boot code addresses in a second storage unit and, when the boot code address in the first storage unit and any one of the boot code addresses in the second storage unit are the same, determining a current time to be a transmission start time of a boot code corresponding to the same boot code address, among the boot codes stored in the internal memory.

22. A non-transitory computer-readable medium having recorded thereon a program to implement a control method of booting a system, the method comprising:
receiving and storing boot codes for execution of a booting operation in an internal memory;
controlling the transmission of the boot codes stored in the internal memory to a central processing unit (CPU) core so that the CPU core can begin to sequentially execute the booting operation before all the boot codes for the booting operation are stored in the internal memory; and
comparing a boot code address in a first storage unit with each of the boot code addresses in a second storage unit and, when the boot code address in the first storage unit and any one of the boot code addresses in the second storage unit are the same, determining a current time to be a transmission start time of a boot code corresponding to the same boot code address, among the boot codes stored in the internal memory.

23. An image forming apparatus having a booting system to execute a booting operation using boot codes, the booting system comprising:
a memory controller to control an operation to store the boot codes in an internal memory and, concurrently, an operation to transmit the boot codes stored in the internal memory to a central processing unit (CPU) core;
the CPU core to request the memory controller to transmit boot codes for the execution of the booting operation, to receive the boot codes requested through the memory controller and to sequentially execute the booting operation using the received boot codes; and
a boot code transmission control unit including:
a first storage unit to store information about a boot code requested by the CPU core;
a second storage unit to store information about the boot codes stored in the internal memory; and
a determiner to compare the boot code information in the first and second storage units with each other to determine transmission times of the boot codes stored in the internal memory.

24. A control method of a booting system to execute a booting operation, the method comprising:
storing boot codes received in an internal memory, storing boot code information requested by a central processing unit (CPU) core in a first storage unit, and storing boot code information stored in the internal memory in a second storage unit;
comparing the boot code information in the first and second storage units with each other to determine transmission times of the boot codes stored in the internal memory;
determining whether the boot code information stored in the first storage unit is the same as any one of the boot codes information stored in the second storage unit while the boot codes are received and stored in the internal memory;
if it is determined that the boot code information stored in the first storage unit is the same as any one of the boot codes information stored in the second storage unit, transmitting a boot code corresponding to the same boot code information, among the boot codes stored in the internal memory to the CPU core before all the boot codes for the booting operation are received and stored in the internal memory; and the CPU core executing the booting operation using the transmitted boot code.

* * * * *